United States Patent [19]

Moolenaar

[11] Patent Number: 5,319,469
[45] Date of Patent: Jun. 7, 1994

[54] METHOD AND APPARATUS FOR CODING DIGITAL IMAGE DATA

[75] Inventor: Abraham Moolenaar, Venlo, Netherlands

[73] Assignee: Oce-Nederland B.V., Venlo, Netherlands

[21] Appl. No.: 833,441

[22] Filed: Feb. 6, 1992

[30] Foreign Application Priority Data

Feb. 8, 1991 [NL] Netherlands ............ 9100225

[51] Int. Cl.$^5$ ............................................. H04N 1/40
[52] U.S. Cl. ..................................... 358/427; 358/433
[58] Field of Search ............................ 358/426–427, 358/433, 261.1–261.3

[56] References Cited

FOREIGN PATENT DOCUMENTS

WO8704032 7/1987 European Pat. Off. .
WO8905083 6/1989 European Pat. Off. .

OTHER PUBLICATIONS

Supplement to IEEE Trans. Aerosp. & Electr. System (1966) Drapkin, P. E., pp. 392–400.
IBM Technical Bulletin (1987), pp. 1246–1247.
American Institute of Aeronautics and Astronautics, Proceedings of 1967 National Telemarketing Conference, Stumpe J. W., pp. 50–56.

*Primary Examiner*—Stephen Brinich
*Attorney, Agent, or Firm*—Birch, Stewart, Kolasch & Birch

[57] ABSTRACT

In the coding of image data corresponding to a raster of pixel values, a generalized run length coding is used in respect of the difference between the pixel values in the raster line to be coded and the pixel values in the same position in the preceding raster line, such that with respect to multi-value pixels (gray values), the generalized run length coding comprises an approximation of the course of the differences as a function of the position in the raster line with a linear function and the code then contains the number of pixels and a characterization of the approximating function, and with respect to binary pixels (on/off), the length is simply a determination of the series of pixel values each equal to the pixel value in the same position in the preceding raster line, wherein in a particularly effective embodiment, this generalized run length coding with respect to the preceding line is combined with generalized run length coding of the pixel values within a line, both methods each being performed in parallel, and the method delivering the most effective code that is the longest series of pixels, compensated for by the length of the code itself, is selected for the actual encoding.

10 Claims, 12 Drawing Sheets

METHOD AND APPARATUS FOR CODING DIGITAL IMAGE DATA

BACKGROUND OF THE INVENTION

1. Field of the Invention

The invention relates to a method and apparatus of coding digital image data and more specifically to a method and apparatus of coding consecutive blocks of data groups having as content the values of pixels of an image.

2. Discussion of Related Art

Digital image data forms the digital representation of a physical image and is e.g. generated by electro-optically scanning an image according to an orthogonal raster of rows and columns of pixels and converting the measured optical density of each pixel into a digital value that may have one of two possible values (black or white) or one of several possible values (shades of gray). Normally, the digital data takes the form of groups of bits or bytes and are stored in a memory in blocks. One such block may correspond to one row or line of pixels of the image.

A method of the kind described above is known from IBM Technical Disclosure Bulletin, Vol. 31, No. 5 (October 1988). In accordance with this known method a series of data groups (a data group being a byte with the gray value of a pixel) having an identical value within a line are coded with a code which contains (a) the number of data groups in the series and (b) the content of those data groups. This coding is generally termed "run length coding". Run length coding is also frequently applied to data groups containing binary pixel values, as is apparent, for example, from U.S. Pat. No. 4,748,512.

If, as in a page of text, the rows of pixels contain many series of identical value, this coding can result in a considerable compression of the image data, and this is an attractive feature in connection with the storage thereof in a memory or with its transmission, for example, over a network. However, there are many series of pixels with identical value in the column direction as well, and they can be used for a more extensive coding, which results in even greater compression of the image data.

Although U.S. Pat. No. 4,748,512 also makes use of a vertical repetition code, it does so only to a very restricted degree, namely by replacing a pixel row completely identical to the preceding one by a repetition code. This is a relatively ineffective coding method, since there is relatively little chance that two consecutive rows will be completely identical.

When a uniform gray surface in an image is detected by a scanner, there will still be small variations in the measured pixel values due to noise and deviations in the scanner. These small variations restrict the codability if complete equality of the corresponding data groups is required. It has been found, however, that minor variations in gray values frequently do not visibly change the total picture, and consequently the choice has been made to make a series of consecutive data groups codable in the case of gray value pixels with minor adjustments of the pixel values. The method according to the invention, therefore, provides for equality "by approximation" and not absolute equality. As a result, in practice the coding results in a much higher compression.

It should also be noted that the approximation of a series of pixel values by a linear function is known per se and is described, for example, in IBM Technical Disclosure Bulletin, Vol. 30, No. 12 (May 1988). However, the use of the pixel values in the preceding line to increase the efficiency of the coding cannot be derived therefrom.

SUMMARY OF THE INVENTION

Therefore, it is an object of the present invention to provide a method and apparatus of coding digital image data which will overcome the above-noted disadvantages.

It is a further object of the present invention to provide a method and apparatus for coding digital image data for consecutive blocks of data groups having as content the values of pixels of an image.

The foregoing objects and others are accomplished in accordance with the present invention, generally speaking, by providing a method of coding digital image data of consecutive blocks of data group having as content the values of pixels of an image, which method comprises replacing a series of contiguous data groups within a block that share a specific property by a code which contains the number of the data groups in the particular series. The method according to the present invention achieves this by comparing the content of each data group with the content of the data group in the sam position in the preceding block and delivering a difference signal based on that comparison and replacing a series of contiguous data groups of which the difference signal is, by approximation, a linear function of the position in the series by a code.

In a further embodiment of the method according to the present invention, coding with reference to the preceding block is combined with run length coding, using the "by approximation" rule, within one block. This embodiment comprises two parallel operations, both starting from the same starting position within the block to be coded, and running along the data groups of the block.

The first operation determines, while stepping from data group to data group, the difference between the contents of the current data group and the data group in the same position in the preceding block, and checks whether the course of the differences thus determined is, by approximation, a linear function of the position in the block over all positions from the starting position. This operation stops at the moment that the result of the check is negative. Then a replacement code is defined for the series of data groups, from the starting position until the position of current data group.

The second operation checks, while stepping from data group to data group, whether the course of the contents of the data groups is, by approximation, a linear function of the position in the block over all positions from the starting position. This operation also stops at the moment that the result of the check is negative and then defines a replacement code for the series of data groups from the starting position until the position of current data group.

Finally, the one of the two series thus found that delivers the most efficient code is selected and replaced by the associated replacement code. Next, the procedure is repeated, starting from the data group that immediately follows the selected series, and so on until the end of the block is reached.

Coding according to the present invention is made effective by extending the equality criterion from the known methods to the requirement that the contents of the data groups in a coded series should be a linear function of the position in that series. This requirement includes the following criteria:

(1) the difference between the corresponding data groups increases or decreases linearly, by approximation; this will for instance occur with a gray value changing in the diagonal direction; and (2) the corresponding data groups always differ an equal amount, by approximation; this will occur in a gray value changing in the vertical direction. A particular case of the second criterion is a difference equal to zero; this case can also be applied to binary pixel values, in which exact equality is required. In such cases the data groups may contain one or a number of, e.g. eight, pixel values. This particular embodiment provides a very powerful compression technique for binary image data.

The data processing operation of the present invention is inclusive of both criteria.

Since the coding method according to the present invention always has recourse to the data groups in the block immediately preceding the block to be coded, decoding must also always make use of the preceding block. In decoding, however, this preceding block is the result of decoding of the code for that block. If this result is not exactly identical to the original block, and this is undoubtedly the case with the approximating coding as described above, then the decoded block will contain errors and increasingly greater deviations may occur due to decoding errors accumulating in consecutive blocks. In the method according to the present invention, this problem is solved in that after coding of a series, the original content of the data groups of that series is replaced by a content corresponding to the result of coding and subsequent decoding of the data groups of that series. Accordingly, the decoding errors will never be greater than the inaccuracies in the code within a block.

The present invention also includes an apparatus for performing the method as stated, which includes means for comparing the content of each data group with the content of the data group in the same position in the preceding block and delivering a difference signal based on that comparison and means for finding a series of contiguous data groups of which the difference signal is by approximation a linear function of the position in the series and designating such series for coding. Under these circumstances the linear function, in accordance with the selected form of the method, may in turn be a sloping linear function or a constant function, possibly with the value zero. Further, the apparatus of the instant invention performs the above-described combination of coding with reference to the preceding block and run length coding within one block.

BRIEF DESCRIPTION OF THE DRAWINGS

The invention will now be explained by reference to the accompanying drawings wherein.

DETAILED DISCUSSION OF THE INVENTION

In the following description of the invention it is assumed that the data to be coded is supplied or stored in a memory in the form of bytes which correspond to the pixels of an image and which, just as with the pixels, are arranged in consecutive lines. The bytes contain 8 bits which, in the case of binary pixels, correspond to the values of 8 adjacent pixels and, in the case of multi-value pixels, i.e. pixels which contain a gray value, correspond to one pixel value.

For the coding, a search is made in each line for a series of bytes which can be described by means of a single code. Three coding methods are available for this, namely, the run length coding (combining a series of identical bytes in a line), coincidence coding (referring to bytes situated at the same place in the preceding line) and copy coding (accepting the bytes to be coded into the code).

The series of bytes concerned in this are coded by a single code consisting of two or more bytes, which shows (1) the number of bytes in the series, (2) the method of coding, and (3) the data further required for decoding.

The number of bytes and the method of coding are combined in the first code byte by dividing the values that this byte can assume into three intervals, each corresponding to a coding method, and increasing the number of bytes by a fixed amount so that their value appears in the associated interval. The 256 values which can be represented with 8 bits are divided, for example, into the intervals 1-100, 101-200 and 201-256, respectively, corresponding to copy coding, run length coding and coincidence coding. The number of bytes is then increased, for example, by the lowest value of the applicable interval minus 1. Henceforth, this amount is referred to as "OFF(CP)", "OFF(RL)" and "OFF(CO)", respectively. The first code byte for a series of 22 bytes coded in respect of run length will then contain the value 122, because OFF(RL) is, in this example, equal to 100. The data further required for decoding varies with the method of coding and will be discussed below.

Figure 1:
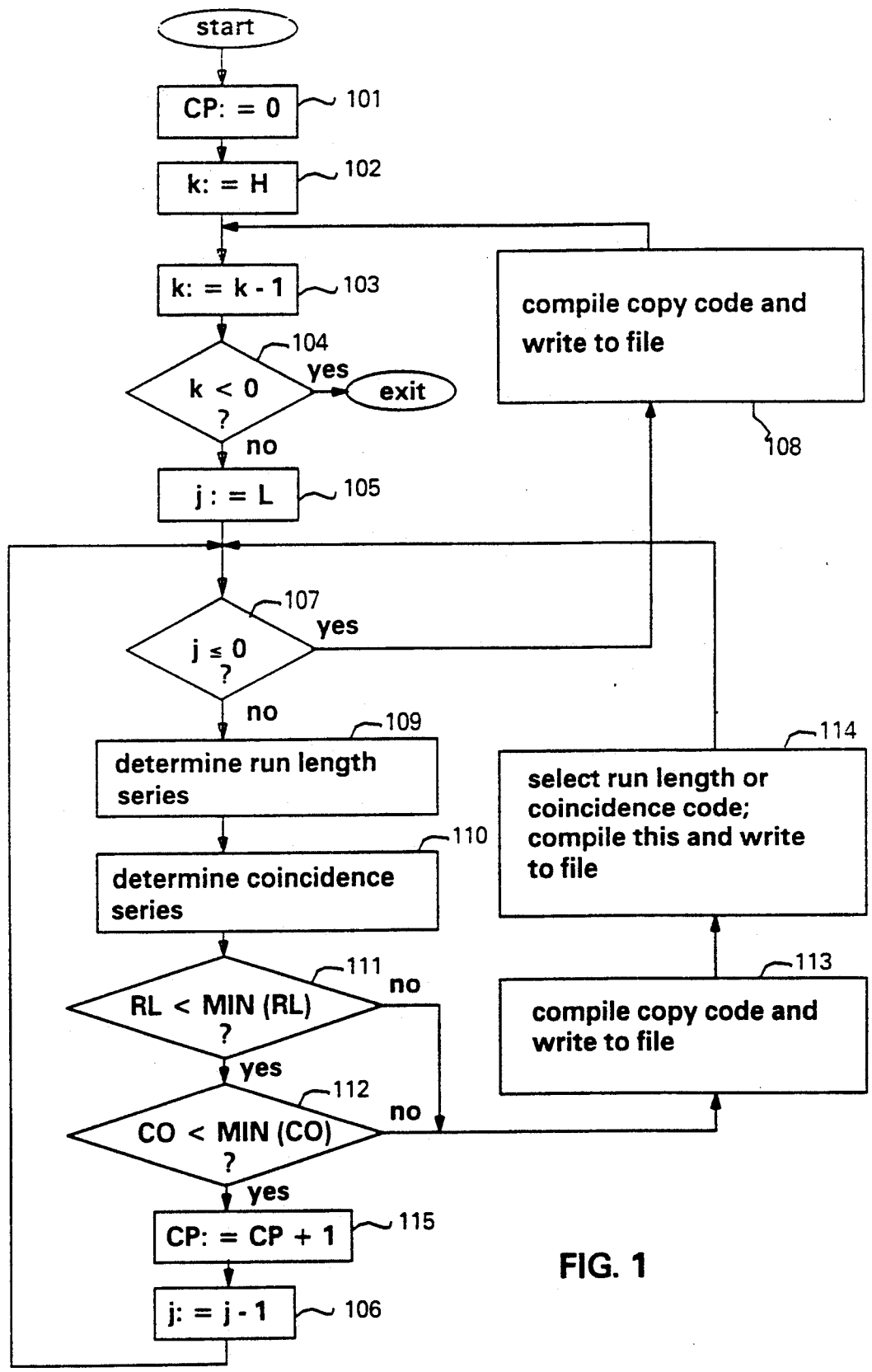
FIG. 1 is a flow diagram of the general form of the method according to the invention.

FIG. 1 is a flow diagram of the general form of the method according to the invention. It is based on an image described in a data file formed by H lines of L bytes. In each case, k denotes the number of lines still to be coded and j the number of bytes still to be coded within the line. Three series counters RL, CO and CP are used which at each time contain the length of the codable series of bytes known at that time. RL contains the length of the run length series, CO that of the coincidence series and CP that of the series formed for copy coding.

At the start of the procedure, counter CP is first set to zero (101) and k is given the value H of the total number of lines of bytes (102). All the lines are then processed in a loop operation. Whenever coding of a new line of bytes (103) is started, a test is made whether the end of the image has been reached (104), in which latter case coding is terminated (exit). Otherwise j is given the initial value L (105) and then all of the bytes in the line are successively processed by reducing j continually by 1 (106). During the coding of a line a test is always carried out to check whether the end of the line has been reached (107) and, if this really is the case, any saved bytes for coding by copy coding are coded and written away in the file for the coded image (108), after which a new line is started (103). At the start of a new line a check is made as to whether the first byte forms part of a series which can be coded by run length coding and, if so, how many bytes this series contains (109). A check is then made as to whether the first byte forms part of a series which can be coded with coincidence coding and, if so, how many bytes that series contains (110). The procedure during these checks is explained hereinafter with reference to FIGS. 2 and 3, which relate to the case of binary pixels, and FIGS. 6 and 7 which relate to the case of multi-value pixels.

The series lengths found are compared with a minimum value (hereinafter referred to as MIN(RL) and MIN(CO) for run length and coincidence coding, respectively) to prevent a very short series from being coded with run length or coincidence coding (111, 112). The reason for this is that copy coding of a very short series requires less bytes than one of the other two coding methods, particularly when a number of very short series follow one another. In that case they can be combined in a copy code. It should be noted that the minimum values for run length and coincidence coding are different because the lengths of these codes themselves differ.

If at least one of the series satisfies this minimum requirement, then any saved bytes for coding with copy coding are coded and written away in the file for the coded image (113). The most efficient coding method (run length or coincidence) is then determined, after which the bytes are coded and written away to the file for the coded image (114).

If the series do not satisfy either of their length criteria, copy coding is selected for the first byte. Since it is not yet known whether the next byte may have to be coded with copy coding as well, the first byte is not yet coded and written away, but is saved. This is done by increasing the counter CP by 1 (115). Only when a series has been found which can be coded with run length or coincidence coding, or when the end of the line is reached, the saved bytes are coded with copy coding and written away in the file for the coded image. The entire procedure described is then repeated starting with the first still uncoded byte of the current line (106).

Figure 2:
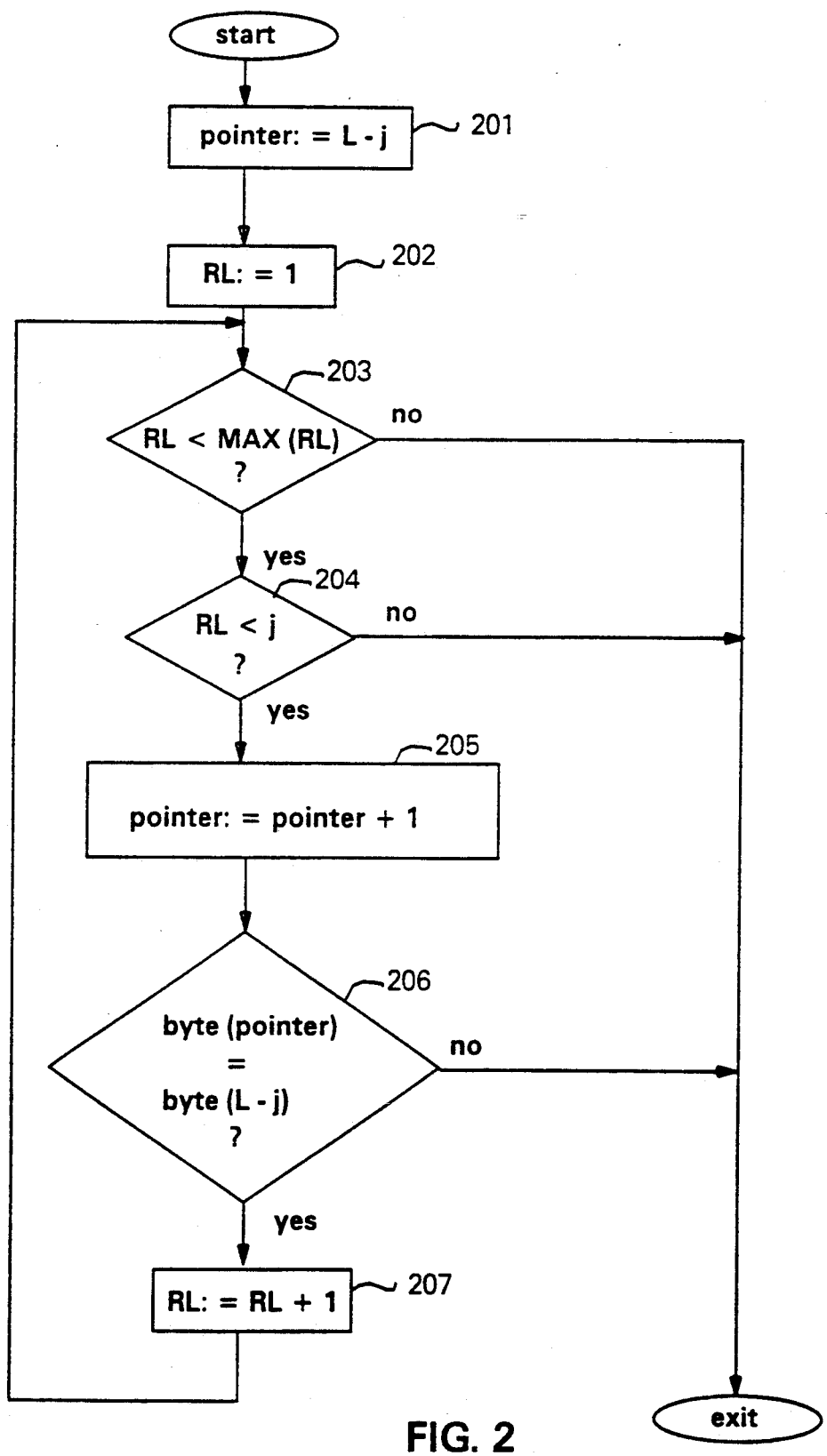
FIG. 2 is a flow diagram of a procedure for searching for a series which can be coded by run length coding.

FIG. 2 is a flow diagram of a procedure for searching for a series which can be coded by run length coding, in the case of binary pixels, in which the bytes therefore each have the values of 8 pixels. This procedure forms a filling in of block 109 in FIG. 1. This procedure makes use of a counter "pointer" for continually indicating the byte to be processed. The procedure starts with initiation of the "pointer" at the position of the first still uncoded byte (201). The series counter RL is then set to 1 (202). The following bytes are then successively processed in a loop operation. The loop operation starts with a check as to whether the maximum number of bytes to be coded in a code has already been reached (203) and a check as to whether the line end has been reached (204). If this is the case, the test is terminated and a return (exit) is made to the main line of the method in FIG. 1. Otherwise, the value of the next byte (205) is compared with that of the byte on the starting position (206). If these values are identical, the counter RL is increased by 1 (207), whereupon the next byte is checked. If the values are not identical, the test is terminated and a return (exit) is made to the main line of the method in FIG. 1. Thus, RL always contains the number of bytes found to be coded with run length coding.

FIG. 3 is a flow diagram, again for the case of binary pixels, of a procedure for searching for a series which can be coded with coincidence coding. This procedure forms a filling in of the block 110 in FIG. 1. This procedure makes use of a counter "pointer" for continually indicating the byte to be processed. The procedure starts with initiation of the series counter CO on value 0 (301), followed by a test (302) as to whether there is a preceding line for comparing the bytes with. If not, i.e. the line under test is the first of the file, the procedure is not started, but a return (exit) is made to the main line of the method of FIG. 1. The "pointer" is then initiated at the position of the first still uncoded byte (303).

The following bytes are then successively processed in a loop operation. The loop operation starts with a test as to whether the maximum number of bytes to be coded in a code has already been reached (304), and a test as to whether the line end has been reached (305). If that is the case, the check is terminated and a return (exit) is made to the main line of the method in FIG. 1. Otherwise, the value of the next byte (306) is compared with that of the byte in the same position in the preceding line (307). If these values are identical, the counter CO is increased by 1 (308), whereupon the next byte can be checked. If the values are not identical, the test is terminated and a return (exit) is made to the main line of the method in FIG. 1. CO thus always contains the number of bytes found to be coded with coincidence coding.

Figure 4:
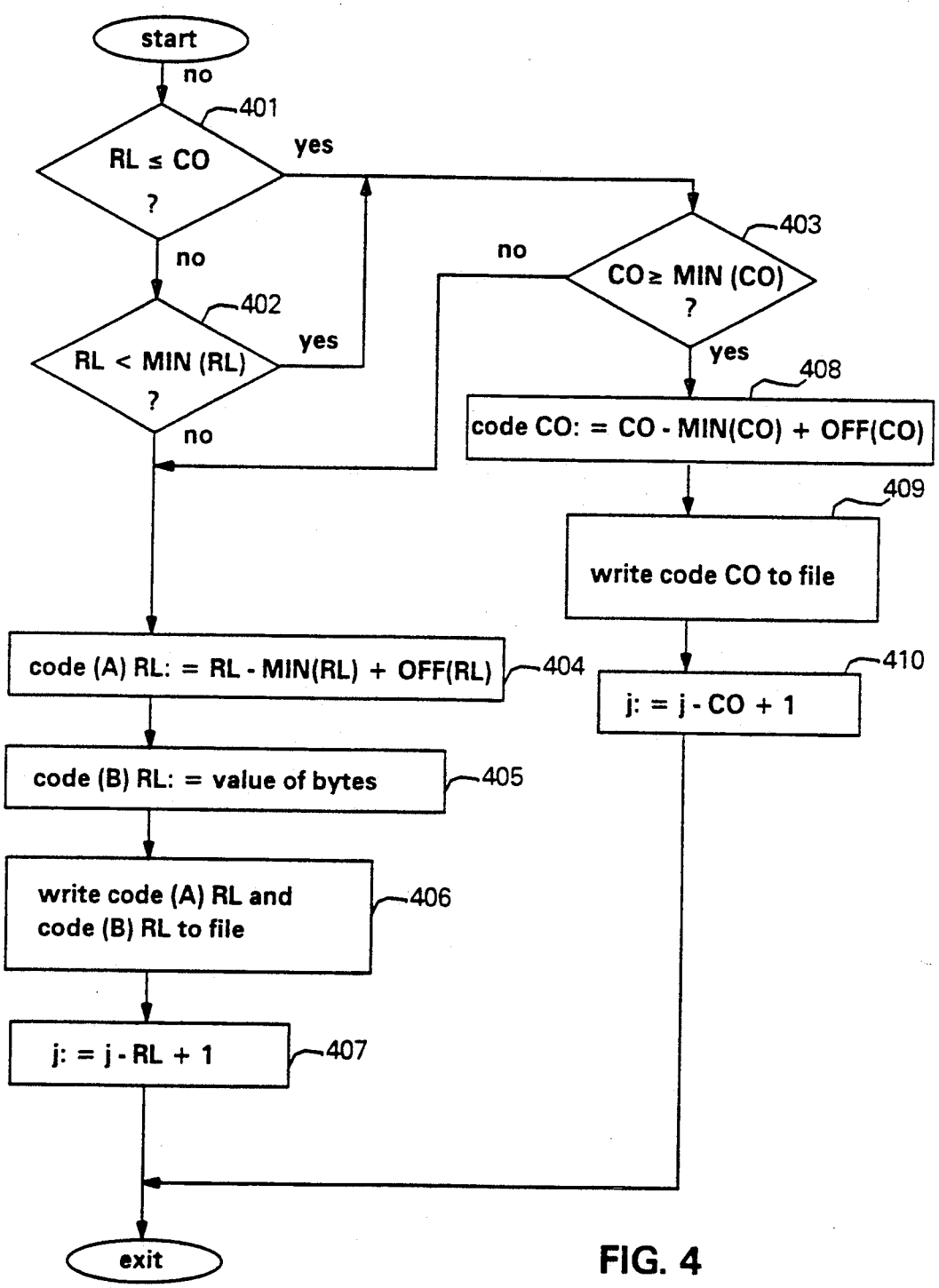
FIG. 4 is a flow diagram of a procedure for selecting and compiling a run length code or a coincidence code and writing this code into the file for the coded image.

FIG. 4 is a flow diagram, again for the case of binary pixels, of a procedure for selecting and compiling a run length or a coincidence code and writing this code into the file for the coded image. This procedure, which forms a filling in of the block 114 in FIG. 1, is reached after it has been established that at least one codable series of sufficient length has been found.

A check is first made as to which method of coding is the most efficient, i.e. yields the fewest code bytes in relation to the number of original bytes. In this example, this is implemented as the coding method with which the most bytes can be coded and hence the length of the various codes themselves is disregarded. An extension of this kind, however, is obvious. The values of RL and CO are compared (401) for this selection. A test is also made as to whether the series of the coding method selected satisfies its minimum length requirement (402, 403). If this is not the case, then the other method of coding is finally selected.

If the run length coding is selected, the code is compiled from two sub-codes each defining a byte. The first sub-code, "code (A)RL" (404), contains the number of bytes of the series less the minimum number MIN(RL) in order to utilize, to the maximum, the value interval available for this coding method, plus the fixed amount OFF(RL) already referred to, which is intended to cause the code to appear in the interval of the run length coding. The second sub-code, "code (B)RL" (405), contains the value of the bytes in the coded series. The compiled code is then added to the file for the coded image (406). After the pointer j has been set to the last coded byte (407) a return (exit) is again made to the main line of the method in FIG. 1.

For decoding, the series is reconstructed by repeating the second byte a number of times, which arises out of the first byte.

If coincidence coding is selected, the code is formed by a byte "code CO" (408), which contains the number of bytes of the series less the minimum number MIN(CO) plus the fixed amount OFF(CO) already referred to, which is intended to cause the code to appear in the coincidence coding interval. This code is then added to the file for the coded image (409). After the pointer j has been set to the last coded byte (410), a return (exit) is made to the main line of the method in FIG. 1.

For decoding, the series is reconstructed by accepting from the previous line the corresponding byte for a number of times which arises out of the code byte.

Figure 5:
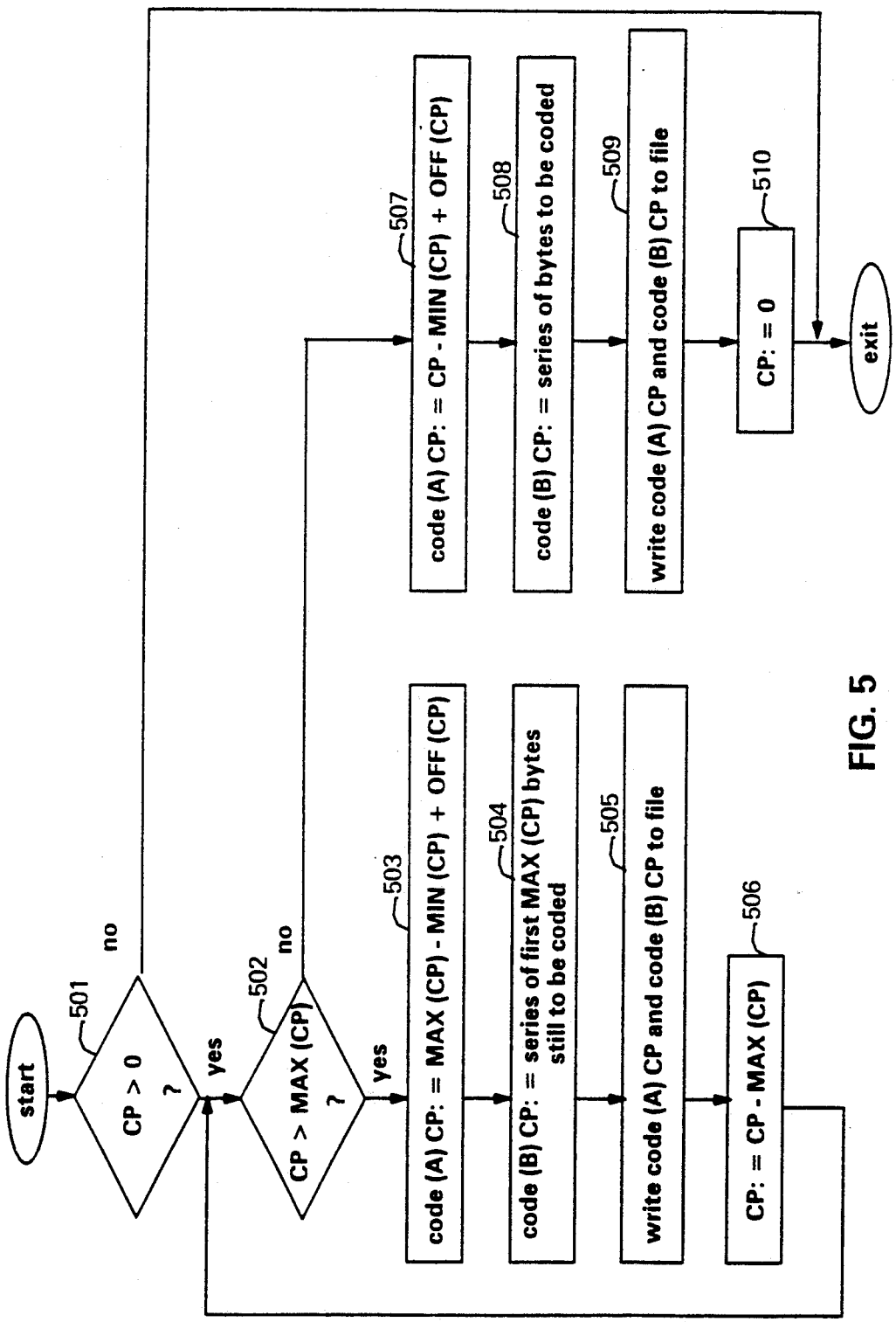
FIG. 5 is a flow diagram of a procedure for compiling a copy code and writing this code into the file for the coded image.

FIG. 5 is a flow diagram of a procedure for compiling a copy code and writing this code into the file for the coded image. This procedure forms a filling in of the blocks 108 and 113 in FIG. 1. Because of the way in which the bytes to be coded in this way are collected, it is not impossible that this procedure may be called up while there are no bytes to be coded. The procedure is therefore started with a test for this (501). If there really are no bytes to be coded, then there is immediately a return (exit) to the main line of the method in FIG. 1.

If the number of saved bytes is larger than the maximum number MAX(CP) to be reproduced in the code test (502), the saved bytes are first coded in blocks of the maximum size and added to the file for the coded image until the number of saved bytes still to be coded has fallen to below the maximum If the number of bytes to be coded is larger than MAX(CP) a block of MAX(CP) bytes is thus coded.

The code is compiled from two sub-codes, the first of which "code (A)CP" (503) occupies a byte. This first sub-code contains the number of bytes of the series less the minimum number MIN(CP) (which in this example has the value 1) plus the fixed amount OFF(CP) previously referred to, which is intended to cause the code to appear in the copy coding interval and which, in this example, has the value 0. The second sub-code "code (B)CP" (504), contains the values of all the bytes in the coded series and therefore has a length equal to the number thereof, MAX(CP). After compilation of the code, it is written into the file for the coded image (505) and the counter (506) containing the number of bytes to be coded with copy coding is reduced by the value MAX(CP). The procedure is then repeated with the rest of the bytes to be coded.

If the number of bytes to be coded as indicated by the counter is less than the maximum number MAX(CP) a similar procedure is carried out with the smaller number of bytes (507, 508, 509) and after counter CP (510) has been set to zero a return (exit) is made to the main line of the method in FIG. 1.

For decoding, the series is reconstructed by reproducing the bytes following the first code byte. The number thereof follows from the first code byte.

The above method is very suitable for coding an image with binary pixels, for when pixels can have only two values there is a relatively considerable chance of two pixels having the same value. The method is additionally also usable in principle for coding multi-value pixels (pixels having a gray value). The conventional practical technique will be taken as the basis hereinafter, in which the value of a pixel is reproduced by a byte (8 bits). It will also be assumed that the bytes concerned are arranged in lines corresponding to the physical arrangement of the pixels in the image.

If the criterion of equality of pixel values, as used hereinbefore, is taken over arbitrarily, the method is relatively inefficient. In the abovedescribed case of one byte per pixel there are 256 gray values possible and hence there is little chance of two pixels having exactly the same value. Minor differences in pixel values can also readily occur in a uniform gray surface, for example, due to noise. Thus coding based on equality of bytes would in practice yield little compression.

Since it has been found that very small differences in gray values are barely visible, if at all, in a print (the human eye being much more sensitive to considerable jumps in gray values than to minor ones), there is no necessity for complete equality. It is sufficient to require equality within a certain margin. In this way it becomes possible, in the case of run length coding, to code the values of a series of consecutive pixels by means of a geometrical function which does not demand complete equality with this function but equality within a certain margin.

On the other hand, in the case of multi-value pixels, it is possible to implement the concept of coincident coding in the form of a coding of the difference between the values of corresponding pixels in the current line and the preceding line. In this way coincidence coding for gray values changes to run length coding of this difference.

The invention provides an approximation for consecutive pixel values (each represented by a byte) with a linear function. Two variants thereof will be described hereinafter. In the first variant, the direction of the linear function can be adapted to the values to be approximated, while in the second variant the linear function is a constant function. Both variants can be used for coding both a run length of pixel values in a line and a run length of the difference between corresponding bytes in the current line and the preceding line (generalized coincidence coding), but in the following example each is used for one of the two.

Starting from a first byte, the two variants form an acceptance interval within which the next byte must be situated, if the approximation is to be successful, and an approximation interval. The acceptance interval converges with the processing of an increasing number of bytes, to a predetermined width "err" and is always so placed that all the processed bytes are contained. The approximation interval diverges at the same time to the same width "err" and finally acquires the same position as the acceptance interval.

In the first variant, the direction is initially determined by placing the linear function through the first two bytes to be coded, but as soon as a subsequent byte is found no longer to be situated within the acceptance interval, the approximation is repeated with a new direction. This new direction is found by correcting the old direction with the difference in value of the byte no longer situated within the acceptance interval and the closest boundary of the acceptance interval divided by the number of bytes by which the byte no longer situated within the acceptance interval is spaced from the starting byte. If this change of direction does not cause any of the bytes already processed to be outside the acceptance interval, the number of bytes approximated by this new direction has increased by 1, because the last byte will now also be situated within the acceptance interval. Otherwise, the number of approximated bytes will become smaller and the new approximation is therefore less successful than the preceding one. In that case the preceding approximation is used for the coding. The direction of the linear function having been found, passing through the center of the approximation interval of the last approximated byte is now selected as approximation.

Figure 9:
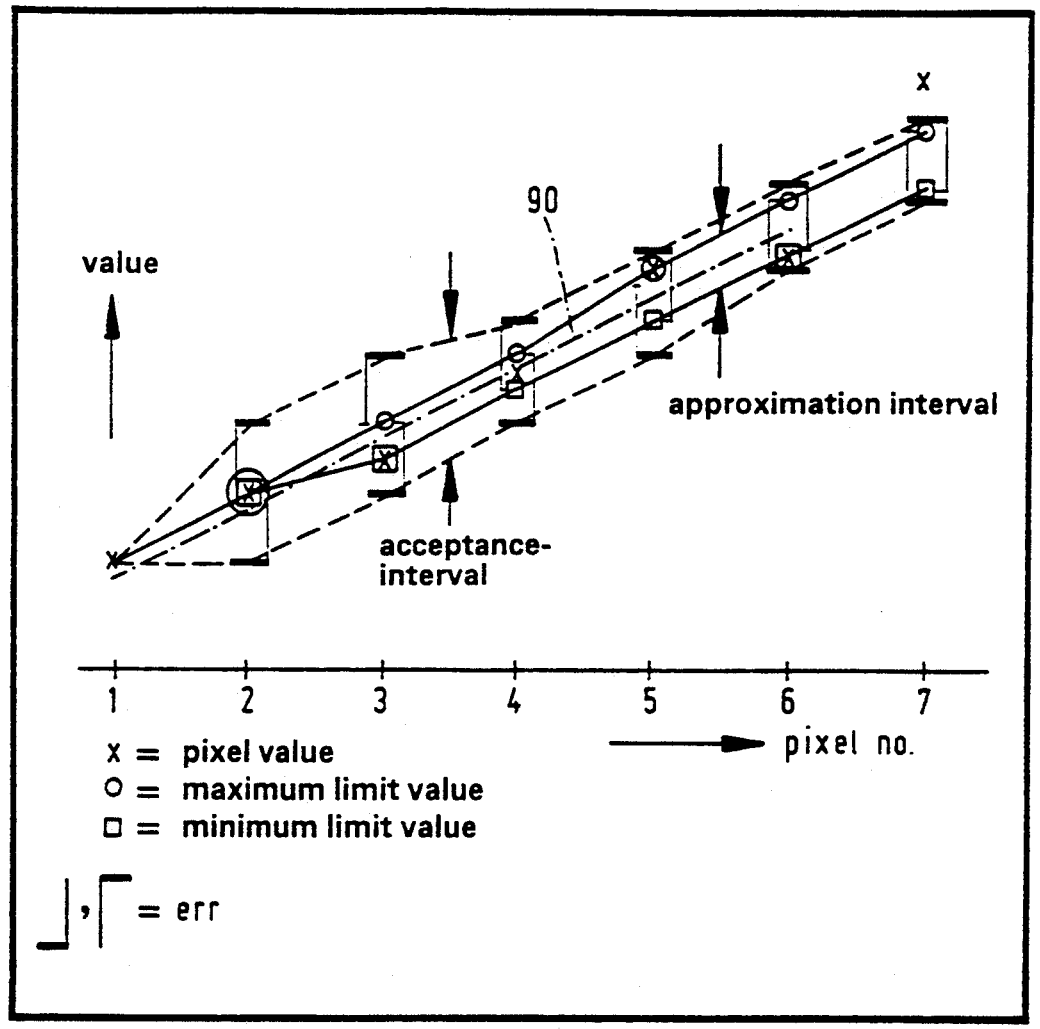
FIG. 9 is a graphic showing a number of data groups in explanation of an approximation procedure according to the invention.

FIG. 9 shows an example of the effect of the first variant. For a number of consecutive pixels indicated by a serial number 1 to 7, the value is graphically represented by an x. The maximum and minimum limit values are always indicated by a small circle and a small square respectively. They define the approximation interval of which the change from one pixel to another is drawn in by a solid line. The acceptance interval, which is defined, on the one hand by the maximum limit value minus a predetermined margin err, and, on the other hand, by the minimum limit value plus the same margin err, is defined by two horizontal lines, their course for consecutive pixels being shown by broken lines. The direction of the connection of the value of the first pixel and that of the second pixel is taken as the approximation direction.

The acceptance interval of a specific pixel is found by moving the acceptance interval of the previous pixel along the approximation direction. If the value of the next pixel is within its acceptance interval but outside the approximation interval moved in the approximation direction, i.e. above the maximum limit value or below the minimum limit value, then the associated limit value is made equal to the value of that pixel, so that the acceptance interval is also changed, because it is coupled to the limit values. In the example of FIG. 9, the value of the 7th pixel is no longer within its acceptance interval so that the approximation applies to the first 6 pixels. The linear approximation function is now formed by the straight line passing through the center of the approximation interval of the 6th pixel and having the approximation direction as direction. In the drawing this line is denoted by a dash-dot line (90).

A check is now made as to whether more pixels can be described with another approximation direction. This is not shown in FIG. 9 since it would otherwise become unclear. The new approximation direction is calculated by dividing by 6 the difference between the value of the 7th pixel and the top limit of its acceptance interval, adding the result of this to the value of the 2nd pixel and drawing the connecting line between the point thus found and the first pixel. The new approximation direction is the direction of this connecting line. The entire approximation procedure is then repeated with this new approximation direction. If it is possible to describe more pixels in this way, a new approximation direction is again determined and the approximation procedure repeated. If an equal number of or less pixels are described with a new approximation direction, the approximation is terminated and the last approximation found is taken as adequate.

The second variant of the approximation is a simplified form of the approximation according to the first variant. In this case the approximation function selected is the constant function passing through the center of the approximation interval of the last approximated byte. The procedure is largely identical to that of the first variant except that no approximation direction is calculated and there is, therefore, no repetition with different approximation directions.

Figure 6A:
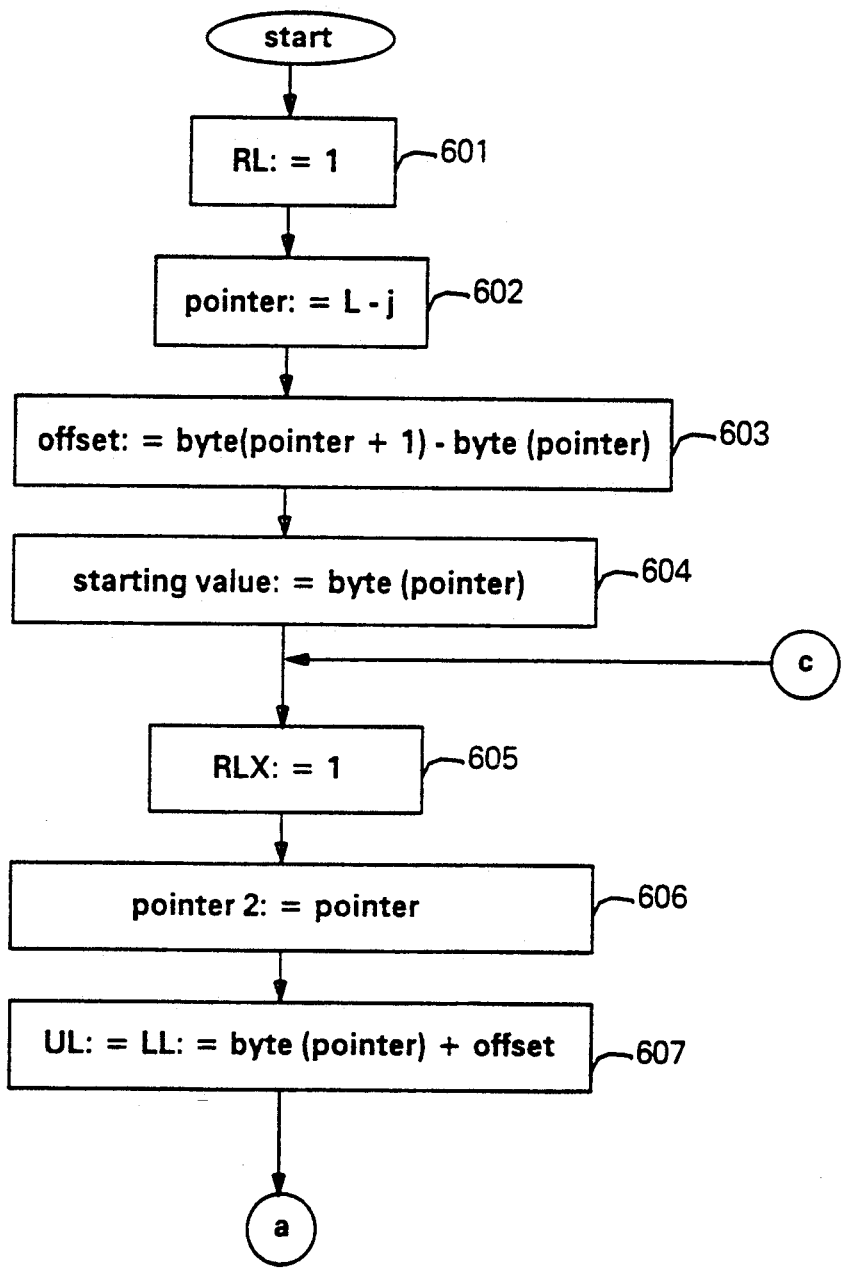
FIG. 6, together with FIG. 6B and FIG. 6C, is a flow diagram of a procedure for searching for a series which can be coded with run length coding.
Figure 6B:
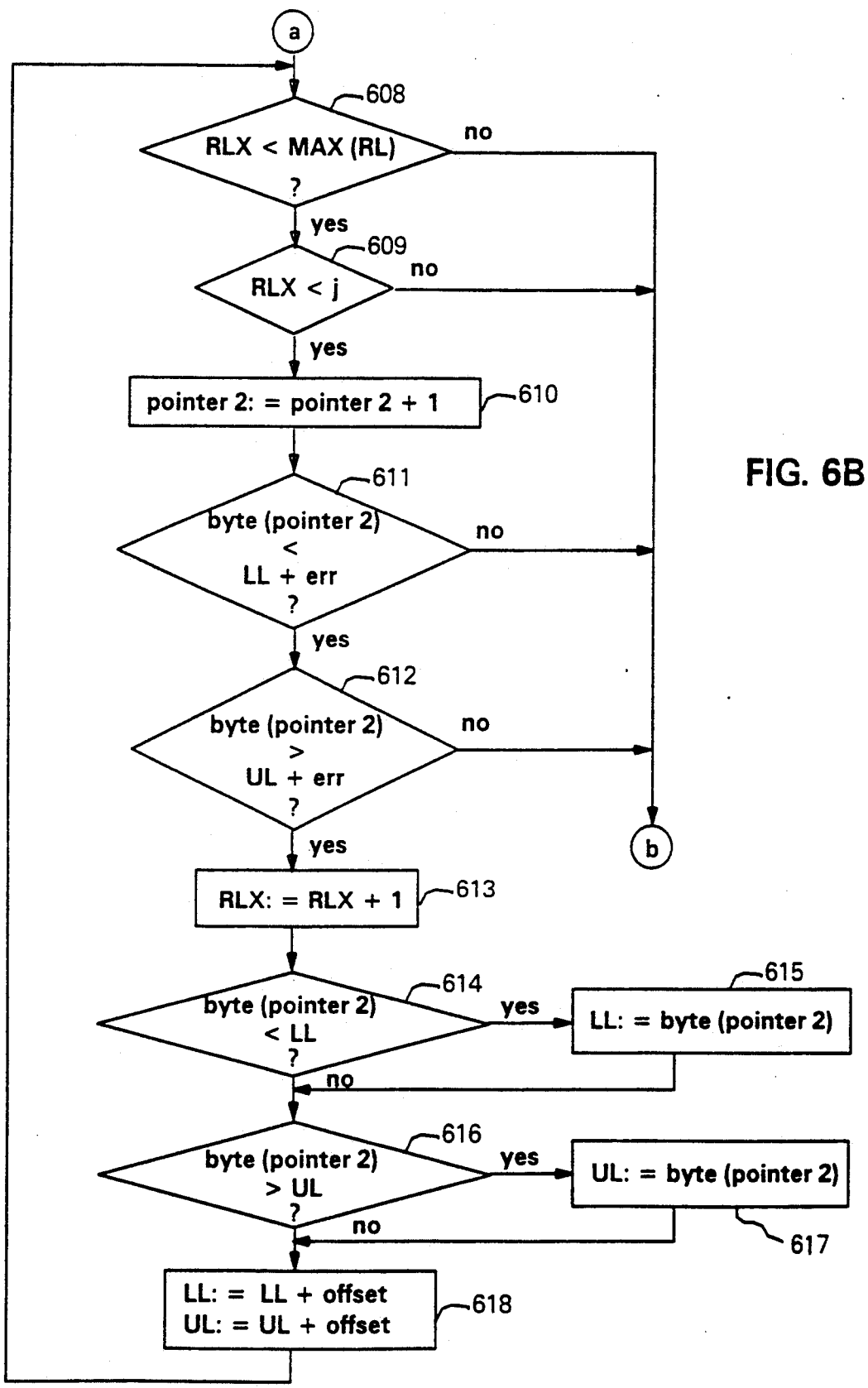
Figure 6C:
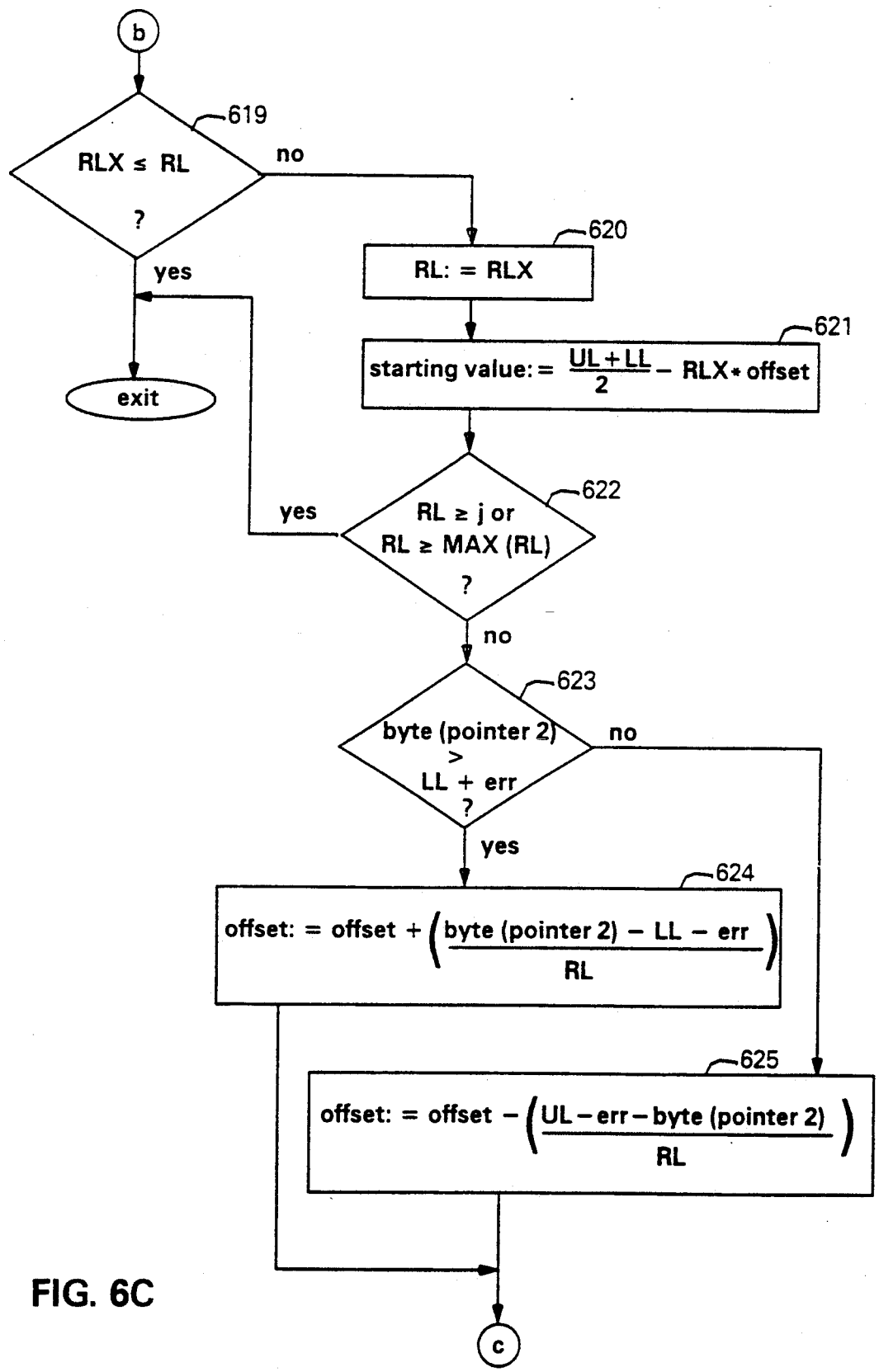

FIGS. 6A, 6B and 6C together show, for the case of multi-value pixels where the bytes each have the value of 1 pixel, a flow diagram of a procedure for searching for a series which can be coded with run length coding in the extended meaning (approximation with a linear function, in this case, in accordance with the first variant of the approximation method). The diagram of FIGS. 6A–6C forms the filling in of block 109 in FIG. 1.

After initiation of the counter RL to value (601) and of the pointer to the position of the first byte to be coded (602), a variable "offset" (603) is provided of a value equal to the difference in value between the byte at the starting position and the next byte. This "offset" determines the direction of the linear approximation function. A variable "starting value" is then filled in with the value of the byte at the starting position (604). This "starting value" determines the position of the linear approximation function. The values of "offset" and "starting value" are provisional values with which a first approximation attempt is carried out. The results of this first approximation attempt, which are expressed in adjusted values for "offset" and "starting value", are again used for an approximation attempt, as described above.

These successive approximation attempts are performed in a loop operation which now follows. The loop operation starts with an initiation of an internal counter RLX (605) which indicates how many bytes can be coded with this approximation. Each approximation loop again contains a internal loop operation for counting the number of codable bytes. In this internal loop the byte to be processed is always indicated by a current variable "pointer 2" (606). Before entering the loop, the "pointer 2" is first filled with the position of the first byte to be coded and a maximum limit value "UL" (607) and a minimum limit value "LL" (607) are filled with the value of the byte at the starting position plus the value "offset". On the first approximation run this corresponds to the value of the first byte after the starting position itself. The maximum and minimum limit values are used to define an approximation interval which will later serve as a basis for the approximation function.

The internal loop operation starts with a test as to whether the maximum number of bytes to be coded with a code has been reached (608) and whether the line end has been reached (609), in which cases the approximation attempt is terminated and the procedure jumps to the evaluation step to be described hereinafter. For the next byte (610) a check is made whether the value of this byte is situated within the acceptance interval, which acceptance interval is defined by "LL+err" (611) and "UL-err" (612), where "err" is a predetermined margin. If this is the case, a counter RLX (613) is increased by 1, otherwise this approximation attempt is terminated and the procedure skips to the previously mentioned evaluation step.

If the value of the byte indicated is within the acceptance interval, then a check is made whether this value is also situated in the approximation interval defined by LL and UL (614, 616). If this is not the case, then the value of LL or UL is first shifted to the value of the byte (615, 617), so that this byte also comes to lie within the approximation interval. It will be clear that in this way the approximation interval and the acceptance interval finally approach one another and also approach a width of "err". If the value of the indicated byte is within the approximation interval, treatment of the next byte in the line is started after the values of "LL" and "UL" have first been adapted by increasing them by "offset" (618).

In the evaluation step a check is made as to whether it is appropriate to carry out a new approximation attempt with new initial values. For this purpose, the run length RLX just found is compared with a run length RL found in a possible previous approximation (619). If RLX is found to be larger than RL or if there is no previous approximation (in the latter case RL still has the initial value 1), a new attempt is made with adapted initial values. In the other cases it is assumed that the previous approximation was the best and the procedure skips back to the main line of the method in FIG. 1, taking with it the values of RL, "offset" and "starting value" from the previous approximation. "Starting value", "offset" and RL describe the approximation function completely. If the completed approximation appears to be better than the previous one, the value of RL is made equal to the newly found value RLX (620) and th approximation function is pushed up so that it passes through the center of the approximation interval of the last byte described by the approximation. This results in a new value for "starting value" (621).

Before calculating a new value for "offset" for a new approximation attempt, a check is first made as to whether the end of the line or the maximum number of bytes to be coded with one code has been reached with the approximation just concluded (622). If this is the case, then it is pointless to make a better approximation attempt and a return (exit) is made to the main line of the method in FIG. 1 with the results of the last approximation.

In the other cases, the approximation function is rotated about the current starting value to an extent such that the first byte, no longer accepted in the approximation attempt which has just concluded, just comes within the associated acceptance interval. This is achieved by correcting the value of "offset" with th difference between the value of that byte and the top limit of its acceptance interval scaled to the distance between two consecutive pixels (623, 624, 625). A new approximation attempt is then carried out with the new values of RL, "starting value" and "offset".

Figure 7:
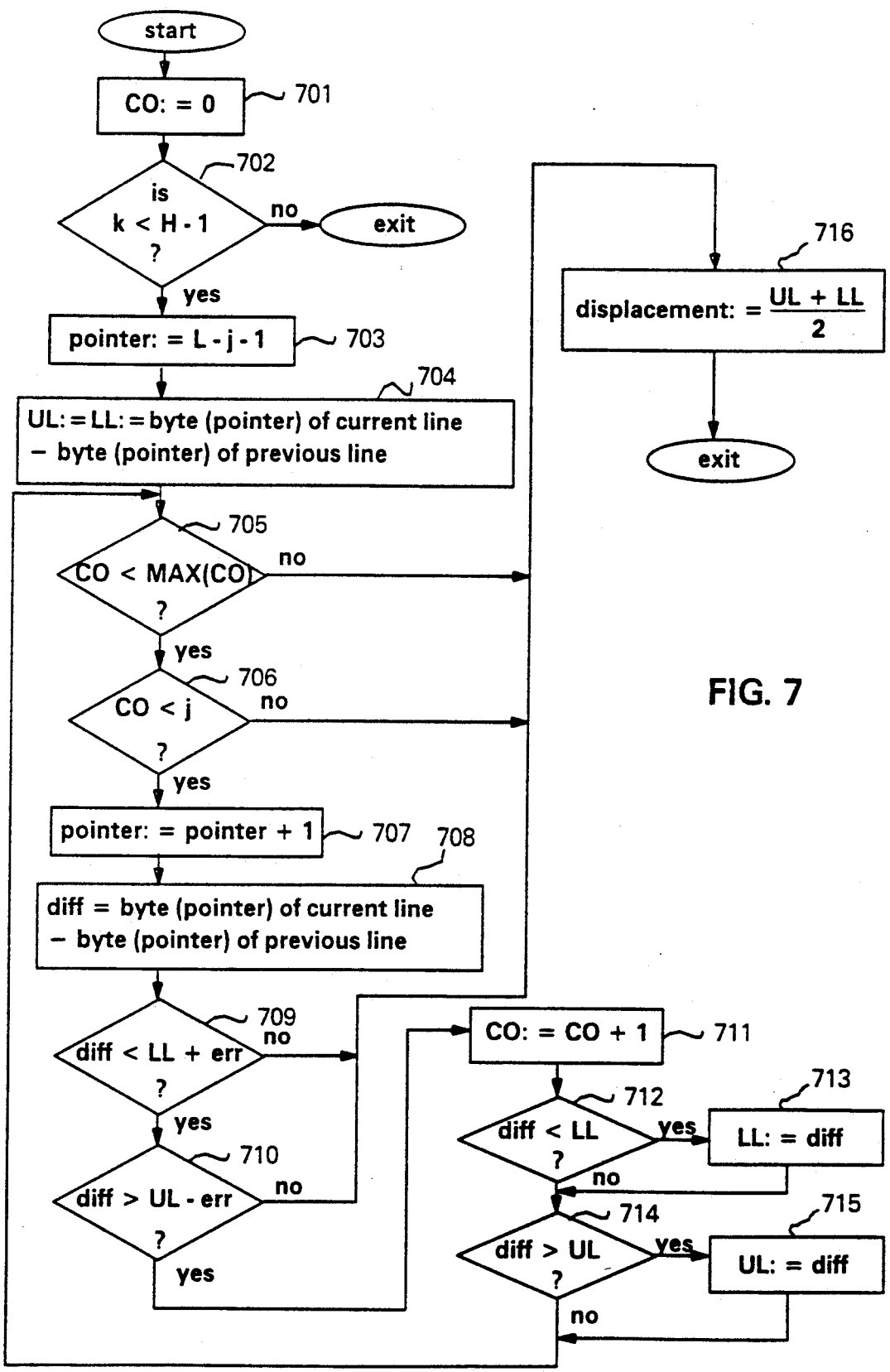
FIG. 7 is a flow diagram of a procedure for searching for a series which can be coded with coincidence coding.

FIG. 7 describes, for the case of multi-value pixels, searching for a series which can be coded with coincidence coding in the extended sense (approximation of the difference between the bytes and the corresponding bytes in the previous line with a linear function, in this case in accordance with the second variant of the approximation method). The diagram of FIG. 7 forms a filling in of block 110 in FIG. 1.

This procedure starts with initiation of the counter "CO" to the value 0 (701), followed by a check as to whether the line of bytes to be coded is the first in the file (702). If this is the case, so that it is therefore impossible to compare the bytes of this line with the bytes of a previous line, then the procedure is immediately abandoned. A current variable "pointer" is then initiated at the position prior to the first byte to be coded (703). For the first byte to be approximated, a maximum limit value "UL" and a minimum limit value "LL" are determined by making both equal to the difference of the value of this byte and the value of the byte in the same position in the preceding line (704). The maximum and minimum limit values enclose an approximation interval which will later serve as a basis for the approximation function.

For the continuously following bytes, a check is then made in a loop operation as to whether the difference between their value and the value of the corresponding byte in the preceding line can be approximated with a constant function. The loop operation starts with a check as to whether or not the maximum number of bytes to be coded with a code has been reached (705) and whether the line end has not bee reached (706), in which case the approximation attempt is concluded.

The value of the next byte (707) is the compared with that of the byte in the same position in the preceding line (708). If the difference, "diff", is situated in the acceptance interval, which acceptance interval is defined by LL +err and UL-err, where err is a predetermined margin (709, 710), then the counter CO is increased by 1 (711), otherwise the approximation attempt is concluded. If the value of the indicated byte is within the acceptance interval, then a check is made as to whether this value is also situated in the approximation interval defined by LL and UL (712, 714). If this is the case, the procedure passes to the next byte; otherwise, the value of LL or the value of UL, respectively, is first shifted to the value of the byte, so that this byte also comes to lie within the approximation interval (713,715). It will be clear that in this way the approximation interval and the acceptance interval finally approach one another and also approach a width equal to err.

On conclusion of the approximation attempt, the approximation value "displacement" is calculated by determining the average value of maximum and minimum limit values of the last byte described by the approximation (716). The procedure then returns (exits) to the main line of the method in FIG. 1. "Displacement" and CO describe the approximation function completely, the value of the bytes thus coded being found by adding the value "displacement" to the value of the corresponding bytes in the preceding line.

Figure 8:
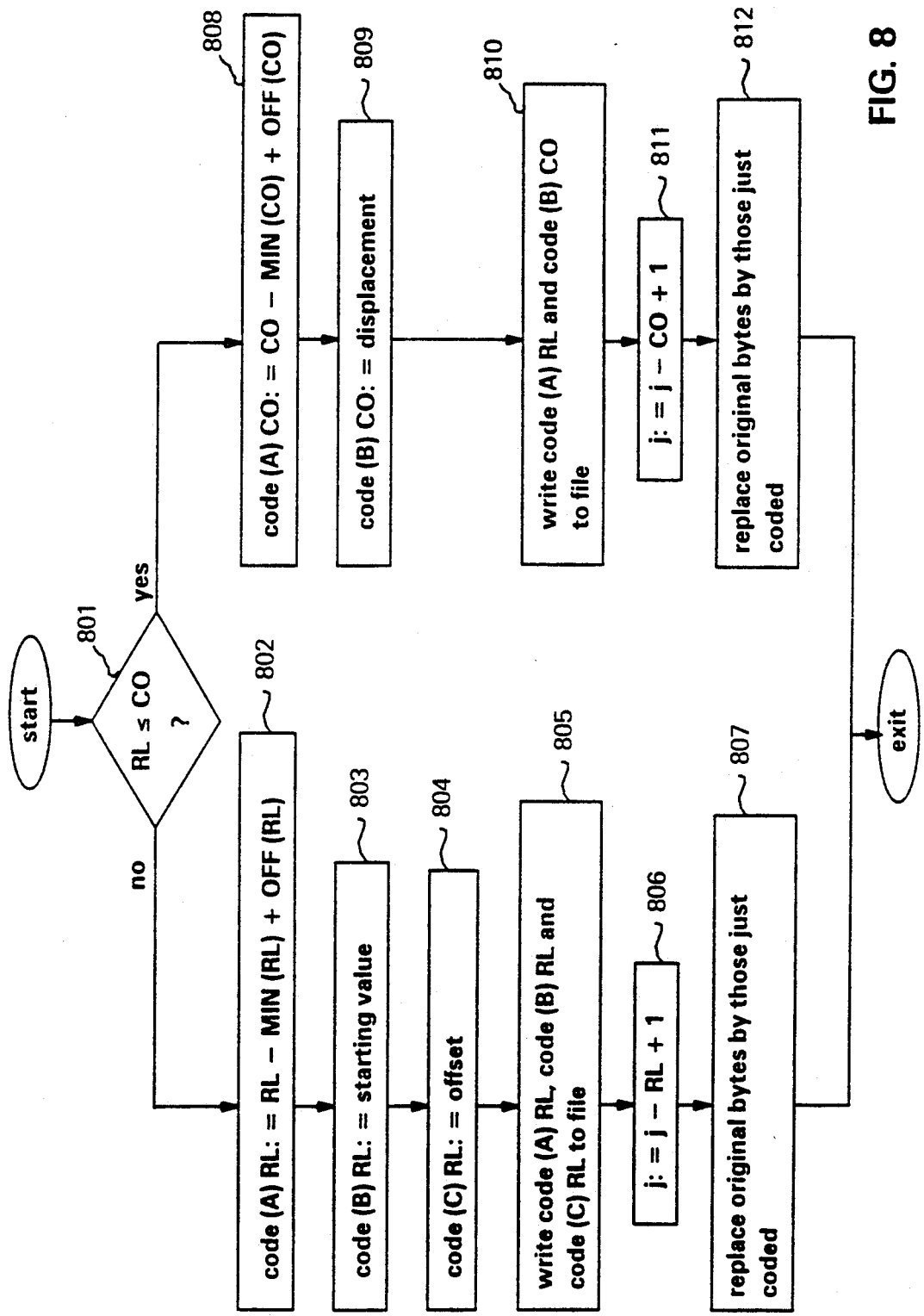
FIG. 8 is a flow diagram of a procedure for selecting and compiling a run length code or a coincidence code and writing the code into the file for the coded image.

FIG. 8 describes, again for the case of multi-value pixels, the selection and compilation of a run length or a coincidence code and the writing of this code into the file for the coded image. This procedure is achieved after it has been established that at least one codable series of adequate length has been found. The diagram of FIG. 8 forms the filling in of the block 114 in FIG. 1.

A check is first made as to what coding method can be used for coding most bytes by comparing the values of RL and CO (801). As an alternative, it would also be possible to take into account here the length of the code itself, thus providing maximum efficiency. In the event that the coding result of the run length coding from FIGS. 6A–6C is selected, the code is compiled from three sub-codes, each occupying one byte. The first sub-code, "code (A)RL" (802), contains the number of bytes of the series less the minimum number MIN(RL), in order to provide maximum utilization of the value interval available for this coding method, plus the previously mentioned fixed amount OFF(RL) which is intended to make the code appear in the interval of the run length coding.

The second sub-code, "code (B)RL" (803), contains the starting value of the linear function found with which the bytes in the series are approximated. The third sub-code, "code (C)RL" (804), contains the direction of the approximation function in the form of the value "offset". The compiled code is then added to the file for the coded image "805".

For decoding, the series is reconstructed by calculating the value in accordance with the linear function characterized in the second and in the third byte, for a number of bytes from the first byte.

The pointer j is then moved to the last coded byte (806) and the original values of the bytes in the memory are replaced by the values following from the coding, so that the latter values can serve as a reference for a possible coincidence coding of the bytes in the next line (807). In this way it is not possible for there to be any accumulation of errors as a result of the approximation in the coding.

In the event of the result of th coincidence coding from FIG. 7 being selected, the code is compiled from two sub-codes each occupying one byte. The first sub-code, "code (A)CO", contains the number of bytes of the series less the minimum number MIN(CO) plus th previously mentioned fixed amount OFF(CO), which is intended to cause the code to appear in the coincidence coding interval (808). The second sub-code, "code (B)CO", contains the "displacement" value found during the approximation (809). The compiled code is then added to the file for the coded image (810).

For decoding, the series is reconstructed by taking over for a number of times following from the first code byte, the corresponding byte from the previous line plus the displacement value given in the second code byte.

The pointer j is then moved to the last coded byte (811) and again the original values of the bytes in the memory are replaced by values following from the coding (812). Finally, the procedure returns (exits) to the main line of the method in FIG. 1. The compilation of a copy code and the writing of this code into the file for the coded image proceeds in exactly the same way as with binary bytes (see FIG. 5) and therefore will not be described again.

Figure 10:
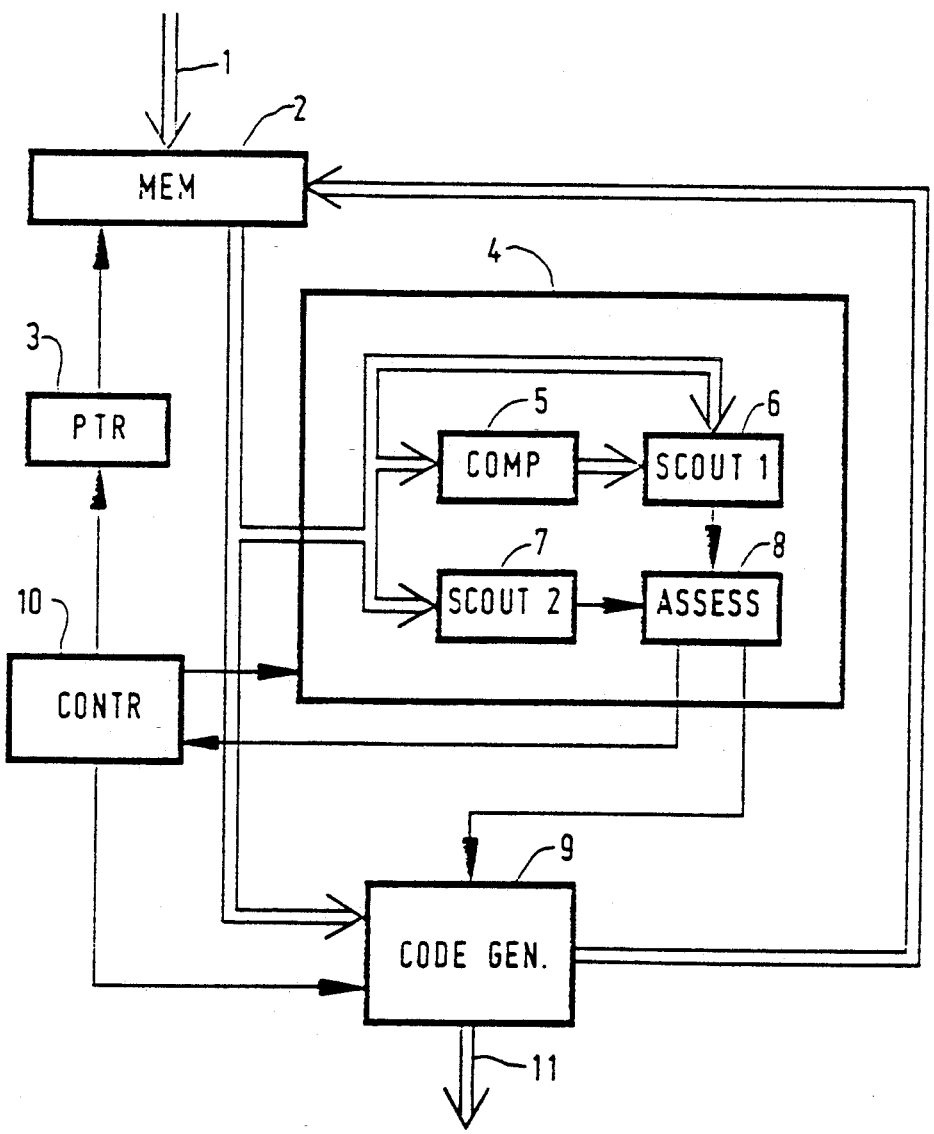
FIG. 10 is a block diagram of an apparatus according to the present invention.

FIG. 10 is a block diagram of an apparatus according to the present invention. This apparatus has a supply line 1 for the image data to be supplied to the apparatus, e.g. from a scanner or from a mass memory (not shown). This supply line is connected to a memory 2 for the storage of at least some of the image data, e.g. two lines of data groups, the term "data groups" denoting, for example, bytes which contain pixel values. A pointer unit 3 is connected to the memory 2. A counter unit 4 is also connected to the memory 2. Counter unit 4 contains a comparator unit 5 and a first scout unit 6, interconnected and both connected to the connection between the counter unit 4 and the memory 2. The counter unit 4 also contains a second scout unit 7 which is also connected to the connection between the counter unit 4 and the memory 2. Within the counter unit 4, the scout units 6 and 7 are connected to an assessment circuit 8. The counter unit 4 is connected to a code generator 9. A control unit 10 is connected to the pointer unit 3, counter unit 4 and code generator 9. Code generator 9 also has an output line 11 for outputting coded image data, for example, to a mass memory (not shown). The units 3 to 10 are program modules in a computer, but could also be in the form of hardware circuits.

Figure 3:
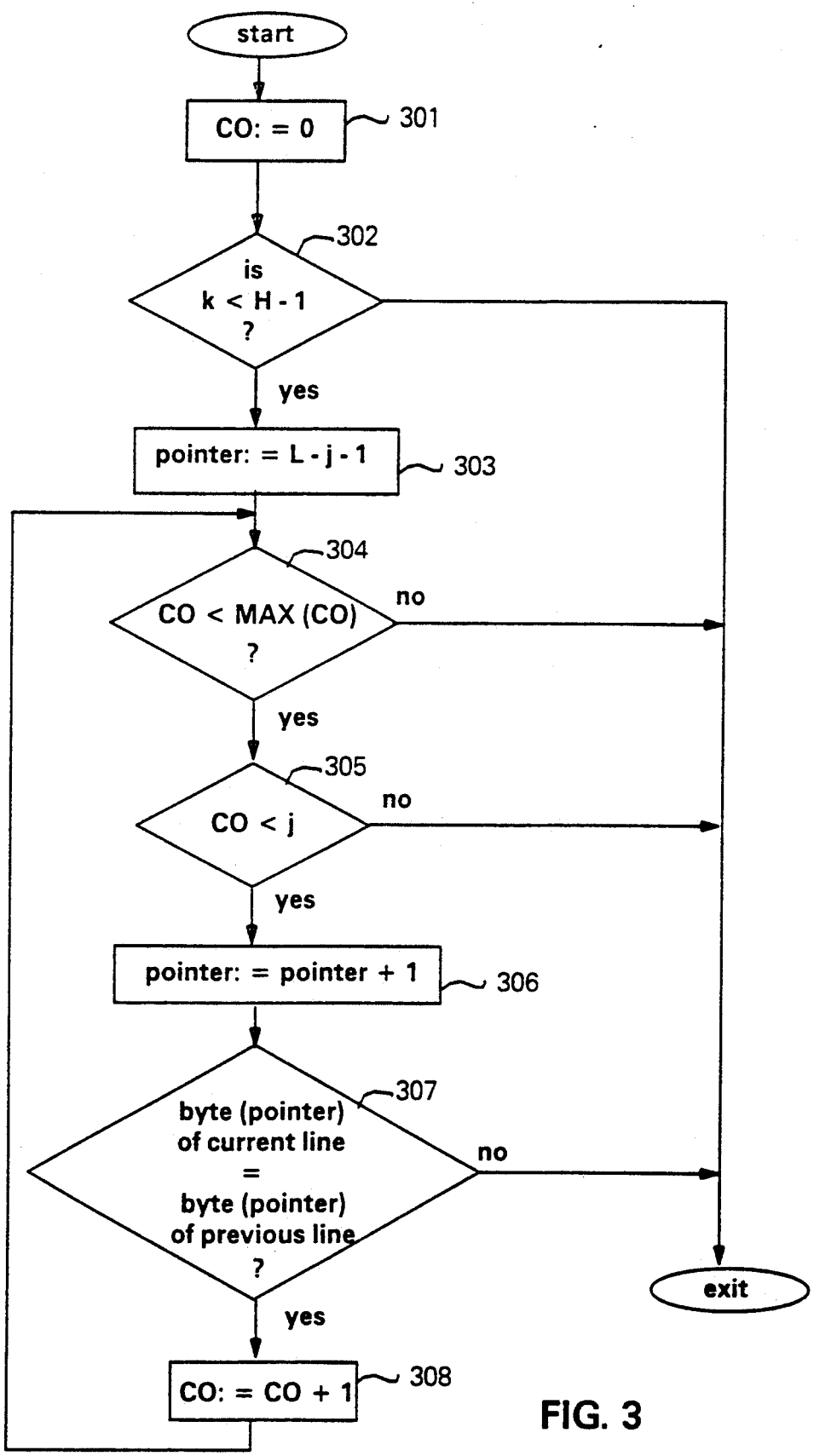
FIG. 3 is a flow diagram of a procedure for searching for a series which can be coded by coincidence coding.

The apparatus operates as follows. Image data is input from outside to the memory 2 and stored therein at memory addresses corresponding to the position of the pixels whose value they contain in the image. For coding, there is no need to store more than two lines of data units: the line to be coded and the line preceding the same (if there is such a line). Coding then starts. It is described below on the assumption that the coding has already advanced somewhat and that part of a line has already been coded. On the command of the control unit 10 the pointer unit 3 indicates the first still uncoded data group of the line to be coded, and then, again on the command of the control unit 10, the counter unit 4 checks whether the data groups following the position indicated by the pointer unit 3, together with the indicated data group, form a codable series, either a series codable by run length, in which case the operations in FIG. 2 or FIGS. 6A-6C are carried out by the second scout unit 7, or a series codable by coincidence, in which case the operations in FIG. 3 or FIG. 7 are carried out by the first scout unit 6 which, in so doing, makes use of the differences between corresponding data groups in the two lines as calculated by the comparator unit 5.

The end results of the two scout units 6 and 7 are passed to the assessment circuit 8 which compares the lengths of the found series with the predetermined minimum lengths. If neither series satisfies this criterion, the assessment circuit 8 passes this on to the control unit 10, which increases by 1 a counter for the data groups to be coded by copy coding, and then orders the pointer unit 3 to indicate the next data group in the memory 2.

If at least one of the two series found satisfies its minimum length criterion, then the assessment circuit 8 passes the lengths found to the code generator 9 and reports this to the control unit 10. The latter then gives the code generator 9 the command for, first of all, converting to a code (in accordance with the procedure of FIG. 5), any data groups still waiting and intended for coding by copy coding and then for selecting the series which can be most efficiently coded and converting the same to a code (in accordance with the procedure of FIG. 4 or 8). The codes are output from the apparatus via the output line 11.

Whenever the code generator 9 has converted a series of data groups into a code, it generates a series of new data groups from the code and places it in the memory 2 at the position of the data groups just coded, to ensure that the correct reference is used for coding the next line of data groups. For decoding, of course, the original data groups are no longer available and thus it is only possible to use the decoded data groups. When the code generator 9 has finished the coding, it reports this to the control unit 10, which then sets the pointer 3 to the first still uncoded data group, whereupon the entire procedure described above is repeated. Further details of the operation of the apparatus described are readily apparent from the description of the method hereinabove.

The above description is only one example of an embodiment of the invention as contained in the claims. It will be clear to the skilled artisan that a number of other embodiments are possible within the scope of the claims.

I claim:

1. A method of coding digital image data comprising consecutive blocks of data groups each data group having as its content the values of one or more pixels of an image, comprising:
   (a) for each respective data group comparing the content of said respective data group with the content of the data group in the same position in a preceding block determining a difference signal based on said comparison and assigning said difference signal to said respective data group;
   (b) searching within a block for a series of contiguous data groups wherein said assigned difference signals of said respective data groups form, at least by approximation according to a predetermined approximation criterion, a linear function of position in said series; and
   (c) replacing a series of contiguous data groups thus found by a code which comprises a representation of the number of data groups in said series.

2. A method of coding digital image data comprising consecutive blocks of data groups having as content the values of pixels of an image, comprising:
   beginning from a starting position in a block to be coded, and always for a following position within said block, determining the difference between the content of the data group in the current position and the content of the data group in the same position in the preceding block and checking whether the course of the difference thus determined is, by approximation according to a predetermined approximation criterion, a linear function of position in the block over all the positions from the starting position, and defining a first replacement code for the longest series thus found;
   beginning from the same starting position in the block to be coded, and always for a following position within the block checking whether the course of the contents of the data groups of the block to be coded forms, at least by approximation according to a predetermined approximation criterion, a linear function of position in the block over all of the positions from the starting position, and defining a second replacement code for the longest series thus found; and
   selecting the one of the two longest series that delivers the most efficient code and replacing it by the associated replacement code.

3. A method according to claims 1 or 2, in which at least one of said linear functions is a constant function.

4. A method according to claims 1 or 2, wherein after a series of data groups has been coded, the original content of the data groups of that series is replaced by a content corresponding to the result of coding, and subsequent decoding of the data groups of that series.

5. A method according to claim 3, in which said constant function has the value zero.

6. An apparatus for coding digital image data comprised of consecutive blocks of data groups, each data group having, as its content, the values of one or more pixels of an image, comprising:
   means for comparing the content of each respective data group with the content of the data group in the same position in a preceding block and for determining a difference signal for each of said respective data groups, based on said comparison;
   means for finding, within a block, a series of contiguous data groups wherein said difference signals of said respective data groups form, at least by approximation according to a predetermined approximation criterion, a linear function of position in said series; and
   a code generator for generating a code representing a series of contiguous data groups found by said finding means, said code comprising a representation of the number of data groups in said series.

7. An apparatus for coding digital image data comprises of consecutive blocks of data groups having as content the values of pixels of an image, according to a method which replaces a series of contiguous data groups within a block that share a specific property by a code which comprises a representation of the number of data groups in the series, said coding apparatus comprising:
   a memory for storing at least part of said image data;
   a pointer connected to said memory for indicating a position
   a counter connected to said memory for counting, starting from the position indicated by said pointer, contiguous data groups within said block which together form a codable series, said counter being provided with a comparator for comparing the content of a data group in the block to be coded with the content of a data group in the same position in the preceding block and delivering a difference signal based on that comparison, and scout unit connected to said comparator and to said memory for checking, starting from a position indicated by said pointer and always for a following position within the same block, whether the course of the difference signals from the comparator is, by approximation, according to a predetermined approximation criterion, a linear function over all positions from the starting position indicated by the pointer; and
   a code generator connected to said counter and to said memory for delivering a code to replace data groups counted by said counter.

8. An apparatus according to claim 7, in which said counter is designed for counting two series of data groups, both starting at the same starting position, and is further provided with a second scout unit connected to said memory for checking, starting from a position indicated by said pointer and always for a following position within the same block, whether the course of the contents of the data groups is, by approximation, according to a predetermined approximation criterion, a linear function over all positions from the starting position indicated by said pointer and in which said code generator is provided with means for selecting, from the two series counted by said counter, the series that delivers the most efficient code.

9. An apparatus according to claims 6, 7 or 8, in which at least one of said linear functions is a constant function.

10. An apparatus according to claim 9, in which said constant function has the value zero.

* * * * *